W. W. WATSON & H. CARLSON.
FILING CASE DRAWER.
APPLICATION FILED AUG. 22, 1912.
1,071,487.
Patented Aug. 26, 1913.
3 SHEETS—SHEET 1.
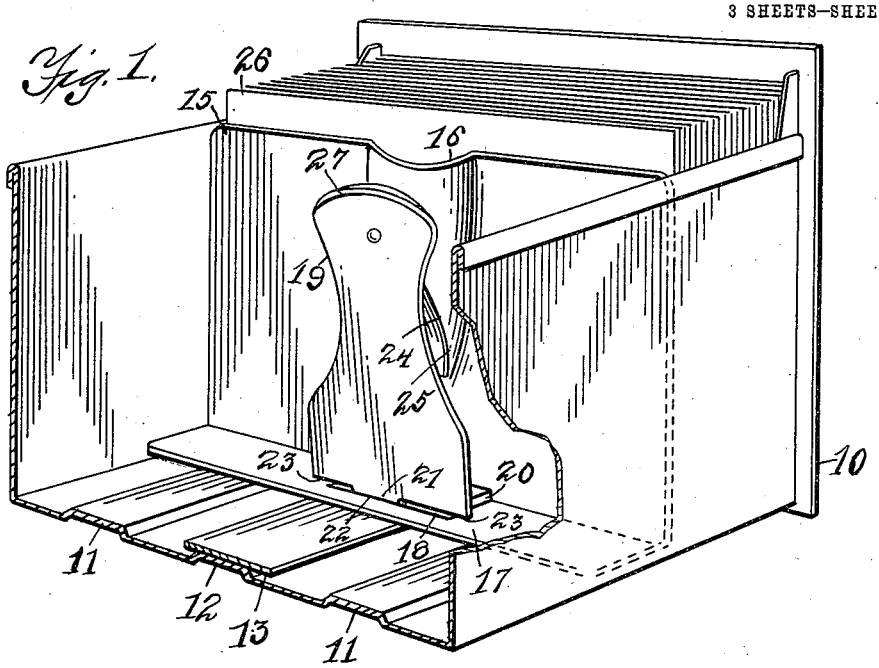
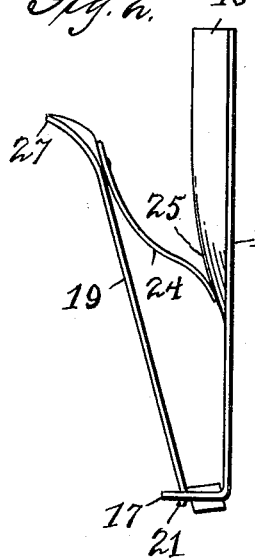
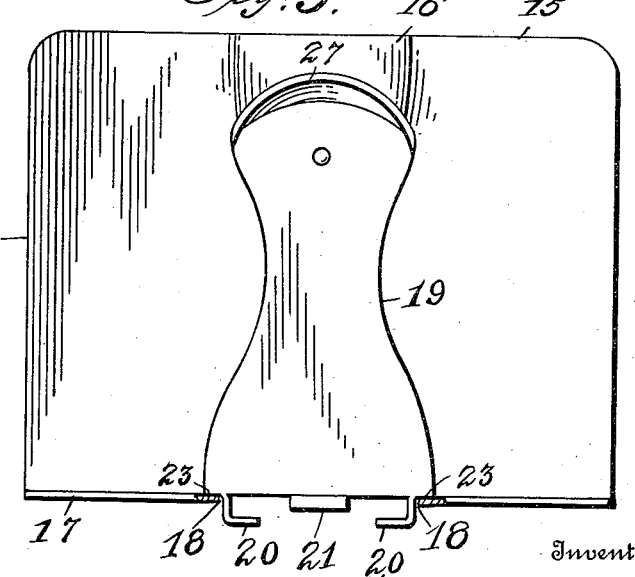

W. W. WATSON & H. CARLSON.
FILING CASE DRAWER.
APPLICATION FILED AUG. 22, 1912.
1,071,487.
Patented Aug. 26, 1913.
3 SHEETS—SHEET 2.
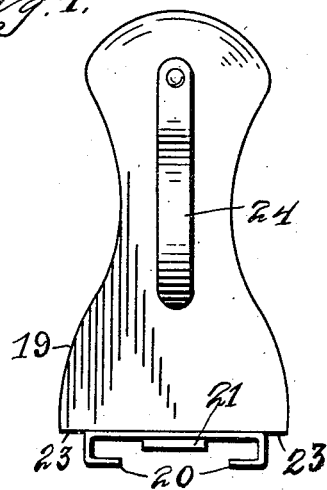
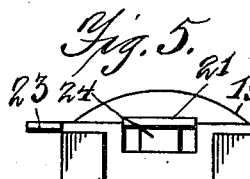
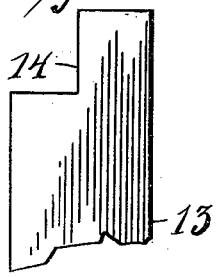
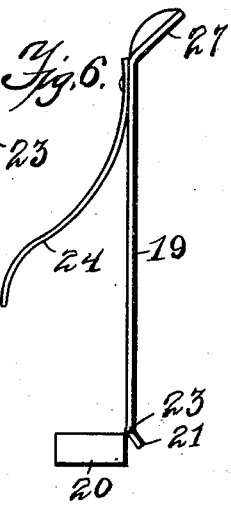
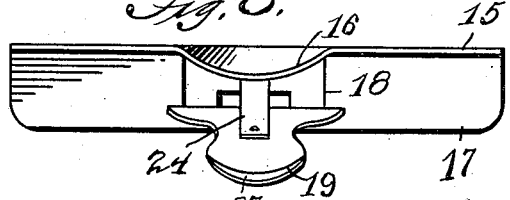
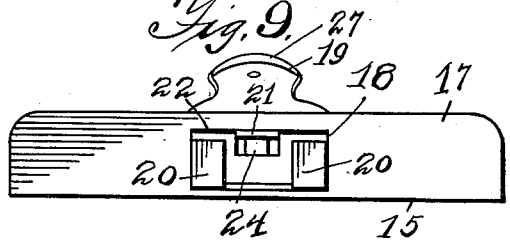
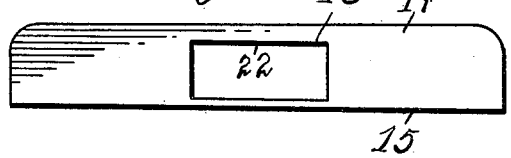
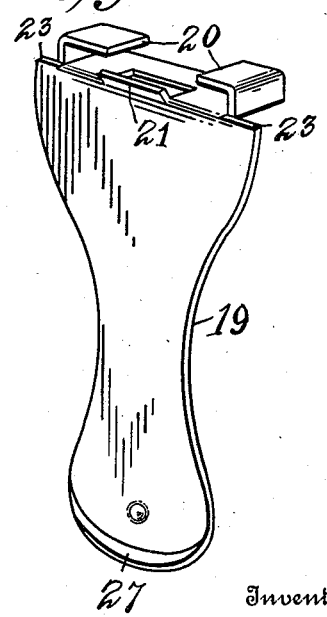

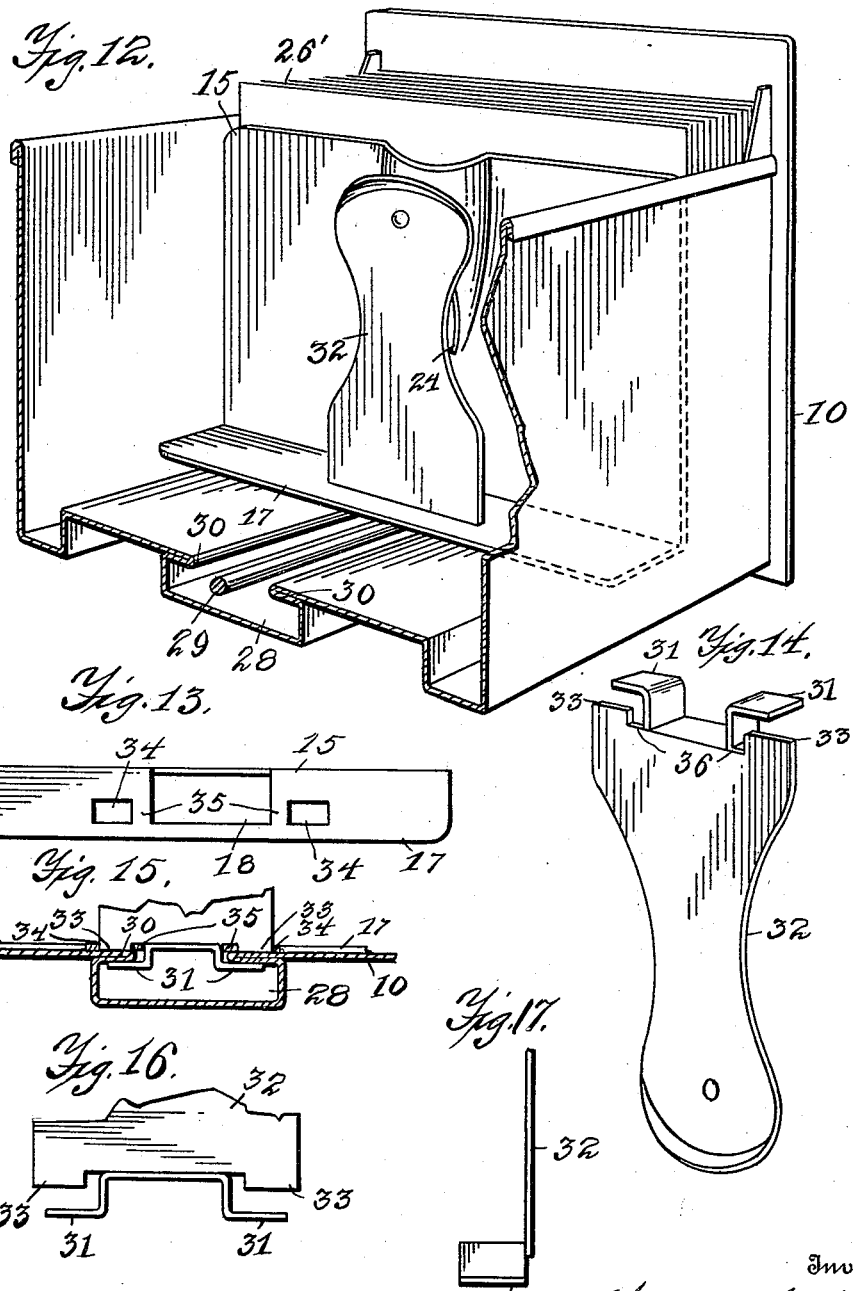

UNITED STATES PATENT OFFICE.

WILLIAM W. WATSON AND HJALMAR CARLSON, OF JAMESTOWN, NEW YORK, ASSIGNORS TO WATSON MANUFACTURING COMPANY, OF JAMESTOWN, NEW YORK, A CORPORATION OF NEW YORK.

FILING-CASE DRAWER.

1,071,487.   Specification of Letters Patent.   Patented Aug. 26, 1913.

Application filed August 22, 1912. Serial No. 716,414.

*To all whom it may concern:*

Be it known that we, WILLIAM W. WATSON and HJALMAR CARLSON, citizens of the United States, residing at the city of Jamestown, in the county of Chautauqua, New York, have invented certain new and useful Improvements in Filing-Case Drawers, of which the following, taken in connection with the accompanying drawings, is a specification.

The invention relates to drawers for filing cases and especially to the follower mechanism for holding the documents or cards compactly within the drawer; and the object of the invention is to provide a follower board with clamping mechanism by means of which it can be pressed firmly against the cards or documents and will hold the same securely within the drawer, yet may be readily released and adjusted in any desired position within the drawer, a guide strip or other clamping means being provided on the bottom of the drawer and the follower having a clamping lever with lugs to engage said strip or clamping means; and the invention consists in the combination and arrangement of the parts as shown in this specification and the accompanying drawings and pointed out in the claims.

In the drawings, Figure 1 is a perspective view of the front portion of the drawer with the follower clamped in position against a number of cards. Fig. 2 is an end elevation of the follower removed from the drawer and showing the spring clamping lever in position thereon; and Fig. 3 is a rear elevation of the same showing the clamping lugs and the locking tongue on the lever. Fig. 4 is an elevation of the locking lever removed from the follower board, showing the spring attached thereto and the clamping lugs and locking tongue thereon; and Fig. 5 is an inverted plan view of the lower end of said lever, showing the relation of the clamping lugs and locking tongue; and Fig. 6 is a side elevation of said lever, showing a detail of the construction of the same; and Fig. 7 is a perspective view of said lever turned with the lower end upward to show the shoulders on said lever and their relation to the clamping lugs and locking tongue. Fig. 8 is a top plan view of the follower with the lever attached thereto; and Fig. 9 is a bottom plan view of the follower with the lever attached thereto. Fig. 10 is a bottom plan view of the follower board, showing the rectangular opening therein through which the lever is inserted. Fig. 11 is a plan view of the end of the guide strip in the drawer bottom showing the notch therein for attaching and detaching the locking lever. Fig. 12 is a perspective view of the front portion of a check filing drawer with a modification of our follower in which the cards are locked within the drawer by means of a rod extending lengthwise of a recess centrally lengthwise of the bottom of the drawer. Fig. 13 is a plan view of the bottom of the follower board without the locking lever attached thereto, showing a modification of the follower board. Fig. 14 is a perspective view of a modification of the locking lever shown in Fig. 7 adapted to lock the modified follower board in a check file drawer. Fig. 15 is a sectional detail of the bottom of the check file drawer, showing the manner of locking the follower board in the bottom groove. Fig. 16 is a detail elevation of the lower end of the modified lever for the check file drawer; and Fig. 17 is an edgewise elevation of said lower end of said lever.

Like numerals of reference refer to corresponding parts in the several views.

The numeral 10 designates a filing drawer which is shown as formed of sheet metal, the bottom of the drawer has lengthwise ribs 11 and 12, and the central lengthwise rib 12 has a metal guide plate or bar 13 attached thereto and extending out each side so as to provide lengthwise guide flanges on each side of the rib 12 and above the bottom. One end of the strip 13 is cut away, as shown at 14 for a purpose hereinafter set forth.

The follower comprises the follower board 15, which is formed with the upright portion preferably having a central finger hold 16 and an angular horizontal flange 17 on its lower edge which supports the follower board in the upright position upon the ribs 11 and guide plate 13. The horizontal portion 17 has a rectangular opening 18 therein to receive the locking lever 19 which holds the follower board 15 adjustably to the guide plate 13.

The attachment of the locking lever 19 to the guide plate 13 to hold the follower board 15 is accomplished in the following manner: The lower end of the locking lever 19 is turned to one side at about right angles and the angular clamping lugs 20 are turned toward one another at each end of said turned lower end of the lever 19. The ends of the lugs 20 are a spaced distance apart so that they may be inserted in the cut-away notch 14 of the guide plate 13 and slipped onto said guide plate, the two lugs 20 holding each side of the guide plate 13 on its under side. A third clamping lug or locking projection 21 is struck from the horizontal portion of the lower end of the lever 19 and is turned at a rearward angle in relation to the vertical portion of said lever 19 so as to brace against the side 22 of the opening 18 in the angle board 15 and at the same time be pressed firmly against the upper side of the flat guide plate 13.

The locking or clamping lug 21 is preferably substantially in line with the projecting shoulders 23 at each side of the lever 19, which project out over the flat portion 17 of the follower adjacent to each end of the opening 18, thereby forming pivotal bearings for the lower end of the lever 19 upon the horizontal portion 17 at each end of said opening 18 and drawing the lugs 20 with a strong grip against the underside of said guide plate 13.

A leaf spring 24 is attached to the lever 19 on the side adjacent to the follower board 15 and the bend for the finger hold 16 is preferably continued down the central portion of the board 15 a sufficient distance to provide the curve 25 for the lower end of the spring 24 to bear against, thereby giving a more direct downward pressure toward the locking lug 21. This arrangement of the lugs 20 and 21 on the locking lever 19 with the shoulders 23 bearing pivotally upon the follower board, as described, permits the follower board to be rocked away from the cards 26 as they are tightly clamped in the drawer 10, so that it is easy to disengage the locking leverage on the guide plate 13, though it holds firmly until the lever 19 is released. The upper end 27 of the lever 19 is preferably turned at a rearward angle opposite the finger hold 16, so that the thumb and finger of the operator may quickly engage the parts in operating the same.

The spring 24 and the board 15 normally hold the lever 19 in a sufficiently strong locking pressure against the guide plate 23 to hold the follower board 15 in position wherever desired. It is apparent, however, that the greater the pressure of the documents or cards 26 against said follower board the greater will be the locking pressure of the lugs 20 and 21 upon the opposite sides of the guide plate 13. It is also obvious that the parts may all be easily struck out by means of suitable dies and are quickly and easily assembled, thereby making a cheap and convenient follower which has a strong locking leverage upon the drawer, yet one which is easily and quickly released.

The check file drawer shown in Fig. 12 has a lengthwise recess or groove 28 central of its bottom and the locking rod 29 extending therethrough to hold the cards 26′ which cards 26′ have projections extending down into the recess 28 and holes through said projections to receive the locking rod 29. This form of filing drawer is an old and commonly used construction. The adaptation of our follower to this form of drawer is exceedingly simple and uses exactly the same principles as in the form of filing drawer wherein the guide plate 13 is attached. The sides 30 of the recess 28 are extended over said recess so as to form guide ways or clamping edges lengthwise of the mouth of the recess 28. Angular clamping lugs 31 are provided on the sidewise turned lower end of the locking lever 32, which are exactly the same as the lugs 20 on lever 19, except that they are turned in the opposite directions to extend out beneath the guide ways 30. In place of the locking lug 21 two locking lugs 33 are provided which bear upon the upper side of the projecting edges or guide ways 30. The lever 32 has a spring 24 which presses against the follower board 15 in exactly the same manner as the spring 24 on lever 19. The follower board 15 is formed exactly the same except that an additional hole 34 is provided each side of the rectangular opening 18 in the horizontal portion 17, which holes 34 receive the locking lugs 33 therethrough as they bear against the guide ways 30. The portion 35 of part 17 each side of opening 18 between said opening and the holes 34 form bearings for the portions or shoulders 36 of the locking lever 32 so that the pivotal point of bearing of said locking lever 32 is in line with the two locking lugs 33 as they bear against guide ways 30, the same as shoulders 23 are in line with the locking lug 21 on the lever 19. It is accordingly apparent that the adaptation of our follower is only a slight modification of the form shown in Figs. 1 to 11 and adapts the same to the check file drawer with the same sure leverage and ease of operation.

The improved follower in its application to either form of drawer is assembled as follows: The lever is inserted through the follower board, the spring holding the lever against the follower board. The follower is then taken between the thumb and finger and by pressure upon the same the clamping lugs are inserted beneath the guide ways of the central strip 13 through the notch 14, which notch may be at either end of said strip to serve this purpose, or in the recess 28 by simply turning the same therein so that the two lugs 31 engage beneath the guide ways 30. The follower then automatically clamps upon the guide ways when pressure upon the lever is released by the operator.

It is obvious that the follower may be braced against a solid body of cards 26 and that the release of the lever by the pressing together of the board and lever by the hand of the operator will so relieve the handling or clamping lugs on the lower end of said lever that it may be rocked with the follower board away from said cards, thereby relieving the follower from the pressure of the cards when the follower has been tightly pressed against the same. This rocking action of the improved locking lever is exceedingly important, since it has been difficult heretofore to securely hold the cards or documents in a filing drawer and at the same time provide a follower which can be easily and instantaneously released from said pressure.

We claim as new—

1. In a device of the class described, the combination of a drawer, guide ways lengthwise of the bottom of said drawer, a follower, a spring locking lever bearing on and extending through said follower, guide lugs on said locking lever engaging beneath said guide ways, and means on said lever for engaging the upper side of said guide ways to draw against said guide lugs and lock the follower.

2. In a device of the class described, the combination of a drawer, guide ways lengthwise of the bottom of said drawer at a spaced distance therefrom, a follower having an opening therethrough above said guide ways, a locking lever for said follower pivotally bearing thereon, and a spring therebetween, guide lugs on the lower end of said locking lever extending through the opening in said follower and engaging beneath said guide ways, and an additional lug on said locking lever to bear in locking engagement on the upper side of said guide ways by drawing against said guide lugs.

3. In a device of the class described, the combination of a drawer, a strip extending lengthwise of said drawer at a spaced distance from the bottom thereof to form guide ways at each side, a follower board having a rearward flange on its lower edge, said rearward flange having an opening therethrough over said strip, a locking lever having shoulders bearing on said flange each side of said opening, guide lugs on the lower end of said locking lever extending through said opening and engaging beneath said guide ways, a third lug on said lever extending through said opening and bearing against the upper side of said strip, and a leaf spring attached to said lever at its upper end and bearing against said follower board with its lower end.

4. In a device of the class described, the combination of a drawer, a strip lengthwise of the bottom of said drawer and at a spaced distance therefrom to form guide ways at each side thereof, a follower board, an angular flanged lower edge to said follower board having an opening therethrough over said strip and guide ways, a finger hold curved rearwardly from the central upper portion of said follower board, a locking lever bearing against said bottom flange of said follower board each side of said opening, guide lugs on said locking lever extending through said opening in said follower board and engaging beneath said strip at each side, a locking lug struck out from said locking lever between said guide lugs to bear on the upper side of said strip and draw against said guide lugs, and a leaf spring attached to the upper end of said locking lever and bearing against said follower board at the lower end of the curve of said finger hold, substantially as and for the purpose specified.

In testimony whereof we have affixed our signatures in the presence of two witnesses.

WILLIAM W. WATSON.
HJALMAR CARLSON.

Witnesses:
H. A. SANDBERG,
H. E. CHINDGREN.

---

Copies of this patent may be obtained for five cents each, by addressing the "Commissioner of Patents, Washington, D. C."